United States Patent
Coldefy et al.

(10) Patent No.: US 9,036,911 B2
(45) Date of Patent: May 19, 2015

(54) METHOD OF EXTRACTING AN OBJECT ON A PROJECTED BACKDROP

(75) Inventors: Francois Coldefy, Lannion (FR); Michel Collobert, Lannion (FR); Mohamed Ali Ben Salah, Champs sur Marne (FR)

(73) Assignee: Orange, Paris (FR)

( * ) Notice: Subject to any disclaimer, the term of this patent is extended or adjusted under 35 U.S.C. 154(b) by 1004 days.

(21) Appl. No.: 12/085,976

(22) PCT Filed: Dec. 4, 2006

(86) PCT No.: PCT/FR2006/051276
§ 371 (c)(1),
(2), (4) Date: Jun. 2, 2008

(87) PCT Pub. No.: WO2007/063262
PCT Pub. Date: Jun. 7, 2007

(65) Prior Publication Data
US 2009/0136131 A1    May 28, 2009

(30) Foreign Application Priority Data
Dec. 2, 2005  (FR) ..................................... 05 53697

(51) Int. Cl.
*G06K 9/34* (2006.01)
*G06K 9/00* (2006.01)

(52) U.S. Cl.
CPC ................................. *G06K 9/00375* (2013.01)

(58) Field of Classification Search
USPC ........................... 382/173, 174, 282; 348/658
See application file for complete search history.

(56) References Cited

U.S. PATENT DOCUMENTS

| | | | |
|---|---|---|---|
| 5,528,263 A * | 6/1996 | Platzker et al. | 345/156 |
| 5,793,441 A * | 8/1998 | Hagerman | 348/658 |
| 6,388,654 B1 * | 5/2002 | Platzker et al. | 345/156 |
| 2005/0162548 A1 * | 7/2005 | Kang et al. | 348/448 |

FOREIGN PATENT DOCUMENTS

FR       2 824 689       11/2002

* cited by examiner

*Primary Examiner* — Chan Park
*Assistant Examiner* — Eueng-Nan Yeh
(74) *Attorney, Agent, or Firm* — Cozen O'Connor (57) ABSTRACT

A method of extracting from a picked-up image an object that is situated in the foreground of a projected backdrop. The method includes an extraction step comprising the steps of establishing a correspondence relationship between pixels of the projected backdrop and of the background of the picked-up image, and defining said object as the set of picked-up pixels that present a departure from said correspondence relationship. The method is applicable to video conferences, to remote teaching, and to television shows.

19 Claims, 4 Drawing Sheets

METHOD OF EXTRACTING AN OBJECT ON A PROJECTED BACKDROP

RELATED APPLICATIONS

This is a U.S. national stage under 35 USC 371 of application No. PCT/FR2006/051276, filed on Dec. 4, 2006.

This application claims the priority of French patent application no. 05/53697 filed Dec. 2, 2005, the content of which is hereby incorporated by reference.

FIELD OF THE INVENTION

The present invention relates to a method of extracting from an image as picked up an object that is situated in the foreground of a projected backdrop. The invention also relates to an extractor module and to a computer program for implementing said method.

A particularly advantageous application of the invention lies in the field of automatically extracting objects on backdrops of projected images that are shared between a speaker and a remote audience, so as to enable the remote audience to see the movements of the speaker relative to the projected images.

There are therefore numerous fields in which the invention can be applied. As examples, mention can be made of video conferences, remote teaching, television shows, etc.

The invention relates more particularly to situations in which it is desired to relay to remote parties a scene that is made up of a speaker who uses hand gestures, e.g. while making a presentation, to point out zones of interest, such as a formula, a diagram, or a map situated on a digital image projected onto a monitor screen, a video projection screen, or a back-projection screen.

Furthermore, seeing the gestures of a remote speaker, as reproduced by the invention, is also of major importance in getting the users of remote collaboration platforms to act together. It is found that with three or more users, it becomes difficult to coordinate the actions of the various parties. Being able to see the gestures of each of the remote users makes it easier to identify who is the author of an action taking place and also to get a better feel for the intentions of each of the other parties.

The invention thus also extends to gesture interfaces for use with screens, monitors, or graphics tables. It is essential to extract the arm and the hand of the user in order to identify a gesture and the associated interaction.

BACKGROUND OF THE INVENTION

A first means for transmitting to remote parties a scene involving a speaker in front of a projected backdrop is to use a video camera to pick up the scene and to transmit the scene to the remote parties over a telecommunications network.

Nevertheless, proceeding in that manner presents the drawback that the optical resolution of the video camera is generally much less than the definition of the projected digital images, such that although the gestures of the speaker are received properly, the backdrop of the image as picked up and transmitted to the remote audience becomes practically illegible, which puts a considerable limit on any interest in performing that type of remote transmission.

To remedy that drawback, one solution consists in sharing the same digital images forming the projected backdrop between the speaker and the remote audience, in extracting the user's gestures from the image as picked up, in transmitting those gestures to the remote parties, and in overlaying them on the shared images. This results in a backdrop image that retains its definition, together with the gestures of the speaker.

In order to extract from the image as picked up an object that is situated in the foreground of a backdrop, where the object is specifically the hands and the arms of the speaker, various methods have already been proposed, and in particular the method described in international application WO 2005/036456.

That known method relies on analyzing local characteristics extracted from the backdrop image, in particular by the discrete cosine transform (DCT) method. The backdrop model is estimated, pixel block by pixel block, by training on a sequence of images of the backdrop, using an assumption that local characteristics have independent Gaussian distributions. Those characteristics are then estimated in the current image, and any pixels or groups of pixels that do not comply with the training model, in application of a given thresholding criterion, are considered as belonging to objects in the foreground. Progressive updating of the backdrop model over time is performed by means of linearly weighting the training parameter between the local characteristics of the backdrop model and the characteristics coming from the current image.

Nevertheless, the segmentation as obtained in this way of foreground objects is generally fairly imprecise, particularly when the backdrop is complex. In addition, any change in the backdrop or in the position of the camera is automatically identified as forming part of the foreground, which naturally leads to major errors in extracting the looked-for objects.

SUMMARY OF THE INVENTION

One aim of the present invention is to provide a method of extracting from an image as picked up, an object that is situated in the foreground of a projected backdrop, that makes it possible to extract an object in a manner that is reliable and insensitive to fluctuations in terms of position, lighting, and composition of the backdrop that is the result of changes in the projected images, all of which can take place while the camera is picking up the scene.

This and other aims of the invention are attained in accordance with one aspect of the invention directed to a method including an extraction step comprised of:
  establishing a correspondence relationship between pixels of the projected backdrop and of the background of the image as picked up, said correspondence relationship being described by a geometrical transformation function H and by a light transfer function T, said geometrical transformation function H being previously estimated by putting particular pixels into correspondence between the projected backdrop image and the image as picked up of said projected backdrop; and
  defining said object as the set of picked-up pixels that present a departure from said correspondence relationship.

Thus, the invention relies on the fact that the projected backdrop is known a priori in the form of a digital image, e.g. stored in a personal computer. The image as picked up of the scene as a whole is constituted by the backdrop in the background and by the object to be extracted in the foreground and it is also known in digitized form, so it is possible to perform very narrow comparison between the projected backdrop and the background as picked up, thus enabling the desired correspondence relationship to be established with a high degree of precision, thereby guaranteeing that the extraction that is performed is very robust.

Furthermore, since the correspondence relationship is updated in real time, the method in accordance with the invention is insensitive to variations in the position of the backdrop and to variations in lighting, with these being taken into account automatically. The projected backdrop can thus be arbitrary and it can be changed over time, like a video recording, a graphical interface that is in use, etc.

In an implementation of the invention, said correspondence relationship is described by a geometrical transformation function H and a light transfer function T as follows:

$$T(I(s))=E(Hs)$$

expressing equality between the brightness T(I(s)) at pixel s in the projected backdrop I, corrected by the light transfer function T, and the brightness E(Hs) observed at the pixel Hs in the image E as picked up, where the pixel Hs is the image of the pixel s after transformation by the geometrical transformation function H.

The invention is not limited to the relationship used above for expressing the correspondence relationship. The invention naturally extends to any other equivalent formulation such as, for example: I(s)=T'(E(Hs)), where T' is a light transfer function going from the image as picked up to the projected backdrop.

In this implementation, said departure from the correspondence relationship is represented by an observed noise level $\epsilon_s$ at each pixel s:

$$\epsilon_s=T(I(s))-E(Hs)$$

From the projected backdrop and the image as picked up, updating is performed in real time at a frequency greater than 25 hertz (Hz) on the geometrical transformation function H and on the light transfer function T. Nevertheless, there is no need to update the function H if the mechanical arrangement coupling the projection surface to the camera picking up the image is rigid.

The light transfer function T may be limited to no more than brightness in terms of gray level, with the advantage of a small computation load, or it can be extended to each of the three color channels, regardless of the way they are represented (RGB, Lab, Luv, Yuv, IHS, etc.), or indeed to any other local characteristics, such as those associated with a battery of Gabor filters for taking image texture into account (H. G. Feichtinger and T. Strohmer, "Gabor analysis and algorithms", Applied and Numerical Harmonic Analysis, Birkhäuser Boston Inc., Boston, Mass., 1998). The light transfer function can then be considered as being a vector $T=(T_i)_{i=1,\ldots,n}$ where i represents a channel and where n is the total number of channels.

Estimation of the geometrical transformation function H and of the light transfer function T relies on the use of robust estimators such as M estimators, e.g. associated with the Tukey function (P. J. Huber, "Robust statistics", New York Wiley, 1981). This model makes it possible to quantify digitally the match for each pixel with the correspondence relationship. It also serves to detect pixels that form part of the foreground.

In accordance with an embodiment of the invention, said method includes an initialization step comprising:
estimating the geometrical transformation function H from the correspondence between particular pixels of the projected backdrop image and of the image as picked up of said projected backdrop; and
initializing the light transfer function T with the identity function.

The precision of such prior estimates can be further increased if, as provided by the invention, said initialization step further includes estimating the geometrical transformation function H and the light transfer function T by minimizing the function F(H,T):

$$F(H,T)=\Sigma_s\rho(T(I(s))-E(Hs)$$

where ρ is an error cost function.

Similarly, the quality of the image of the object obtained after the extraction step can be improved in accordance with the invention, by said method including a post-treatment step consisting in regularizing the extracted object. The term "regularization" is used to designate operations consisting both in eliminating background zones still present in the extracted object, and in eliminating false detections of the extracted object that appear in the background.

Finally, in order to find a good estimate of the function T over n channels, the invention provides for the extraction step to include a prior step of adjusting the brightness channels I of the backdrop.

An embodiment of the invention provides an extractor module for extracting from an image as picked up an object situated in the foreground of a projected backdrop, the module being remarkable in that it comprises means for:
establishing a correspondence relationship between pixels of the projected backdrop and of the background of the image as picked up; and
defining said object as the set of picked-up pixels that present a departure from said correspondence relationship.

According to an embodiment of the invention, said module includes means for computing said geometrical transformation function H and said light transfer function T by minimizing the function F(H,T):

$$F(H,T)=\Sigma_s\rho(T(I(s))-E(Hs))$$

expressing the accumulated error over the set of pixels s between the brightness T(I(s)) at pixel s of the projected backdrop, corrected by a light transfer function T, and the brightness E(Hs) at pixel Hs of the image E as picked up, where pixel Hs is the image of the pixel s as transformed by the geometrical transformation function H, and where ρ is an error cost function.

According to an embodiment of the invention, said module includes post-treatment means suitable for regularizing the extracted object.

According to an embodiment of the invention, said module includes channel adjustment means for adjusting the channels derived from the brightness I of the backdrop.

An embodiment of the invention provides a computer program including program code instructions for implementing the steps of the method of the invention when said program is executed on a computer.

DETAILED DESCRIPTION OF THE DRAWINGS

Figure 1A:
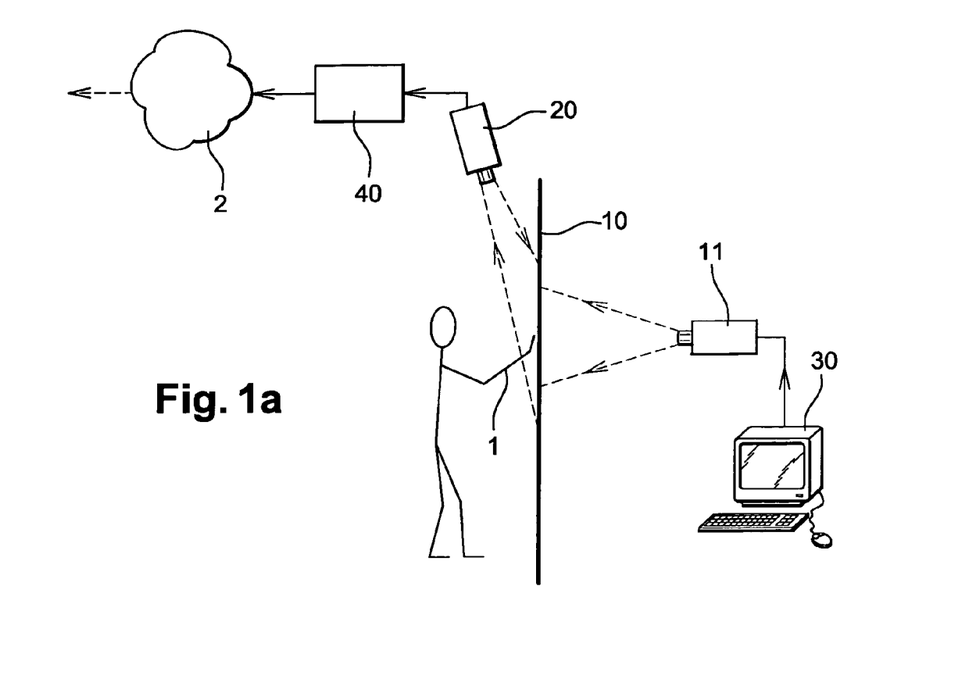
FIG. 1a is a diagram showing a first implementation of the invention.
Figure 1B:
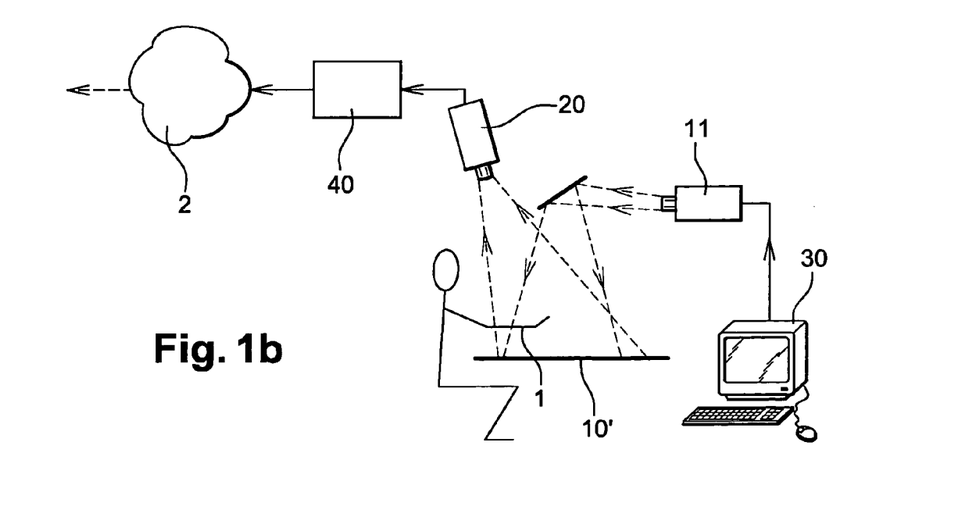
FIG. 1b is a diagram showing a second implementation of the invention.

FIG. 1a shows a first implementation of a method for automatically extracting an object 1 from an image as picked up by a video camera 20, where the object 1 is situated in the foreground of a backdrop, itself made from images controlled by a personal computer 30 and projected onto a surface 10 by a video projector or back-projector device 11, as shown in FIGS. 1a and 1b. In the variant of FIG. 1, the projection surface is a digital table 10'.

In the two examples shown in FIGS. 1a and 1b, the object for extraction is the arm 1 of a speaker during a video conference in the presence of remote parties. For this purpose, the video camera 20 is connected to a telecommunications network 2 suitable for transmitting the digital image output by the camera 20 via a module 40 acting to extract the object 1 in accordance with the method of the invention.

Figure 2A:
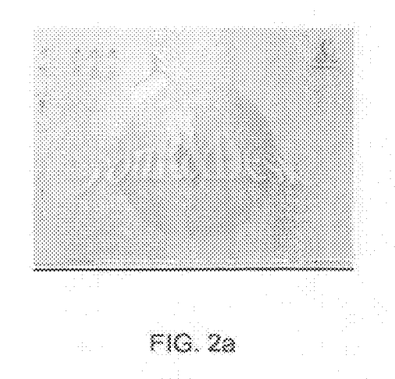
FIG. 2a shows a projected backdrop constituting a background for an image as picked up.

FIG. 2a shows an example of the backdrop that is projected onto the surface 10 or 10'.

Figure 2B:
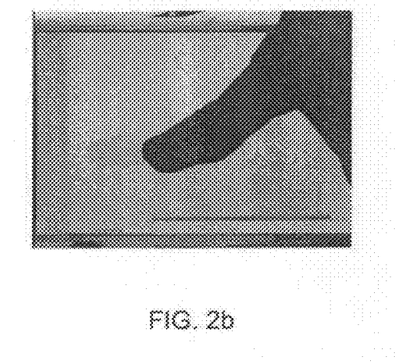
FIG. 2b shows an image as picked up of a foreground object on the FIG. 2a backdrop.

The image of the speaker as picked up directly by the camera 20 is shown in FIG. 2b. In this figure, it can be seen that the backdrop is of quality that is so poor as to make it illegible for a remote party receiving this image in that condition.

Figure 2C:
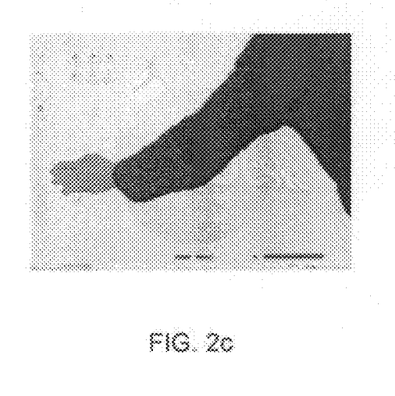
FIG. 2c shows a remote image obtained by applying the method in accordance with an embodiment of the invention to the image as picked up of FIG. 2b.

To remedy this situation, it is proposed that remote parties should have available the same backdrop images as the speaker, given that this does not present any difficulty since these are images that can be transmitted in the form of digital files or images that are available on each of the remote terminals and that are displayed synchronously. It then suffices to extract the object 1 from the image picked up by the camera 20 by means of the extractor module 40, to transmit to the remote parties the object 1 as extracted in this way, and to superpose it locally on the backdrop 10. This produces the image of FIG. 2c where the extracted object can be seen on a backdrop of good quality.

The foreground/background extraction performed by the module 40 relies on a priori knowledge of the backdrop, which is an image projected onto a plane surface 10 or 10'. This backdrop image is referred I below. The camera 20 picks up the scene constituted by the projected image and by any objects 1 that might be located in the foreground. The image picked up by the camera is referenced E.

The image of the projected backdrop as picked up by the camera 20 is known, apart from the effects of a geometrical transformation function H and of a light transfer function T.

When the projection surface is plane, the geometrical transformation function H is modeled in the general case by a homography, or by an affinity if the focal axis of the camera is practically perpendicular to the projection surface.

As mentioned above, the light transfer function T is in fact a vector $T=(T_i)_{i=1,\ldots,n}$ in which the n components i represent the analysis channels used. In the simplest case in which only brightness is used for expressing the transfer function T, the computation load is small but to the detriment of the precision with which foreground/background extraction is performed.

Below, to improve readability, the index i is omitted when not essential.

The extraction method implemented by the module 40 relies on constructing a correspondence relationship between pixels or image elements of the projected backdrop and of the background of the image picked up by the camera 20. This relationship can be expressed using the functions H and T as follows:

$$T(I(s))-E(Hs)=0$$

expressing equality between the brightness $T(I(s))$ at pixel s of the projected backdrop, corrected by the light transfer function T, and the brightness $E(Hs)$ of the pixel Hs of the image as picked up, which pixel Hs is the image of the pixel s as transformed by the geometrical transformation function H.

The object to be extracted is then defined as being the set of picked-up pixels that present a departure from the correspondence relationship $T(I(s))-E(Hs)=0$, i.e. $\epsilon_s=T(I(s))-E(Hs)$, and $\epsilon_s \neq 0$.

Figure 3:
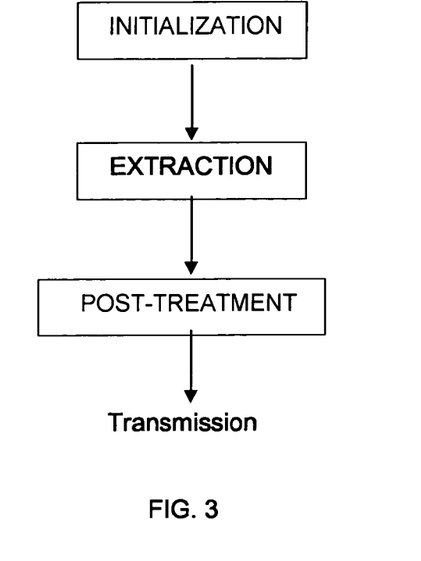
FIG. 3 is a general diagram of the extraction method in accordance with an embodiment of the invention.

FIG. 3 shows the various steps of an extraction method in accordance with the invention, specifically: an initialization step; an extraction step proper; and a post-treatment step. The object obtained at the end of those steps of the method is transmitted, e.g. to all of the remote participants in a video conference.

Figure 5:
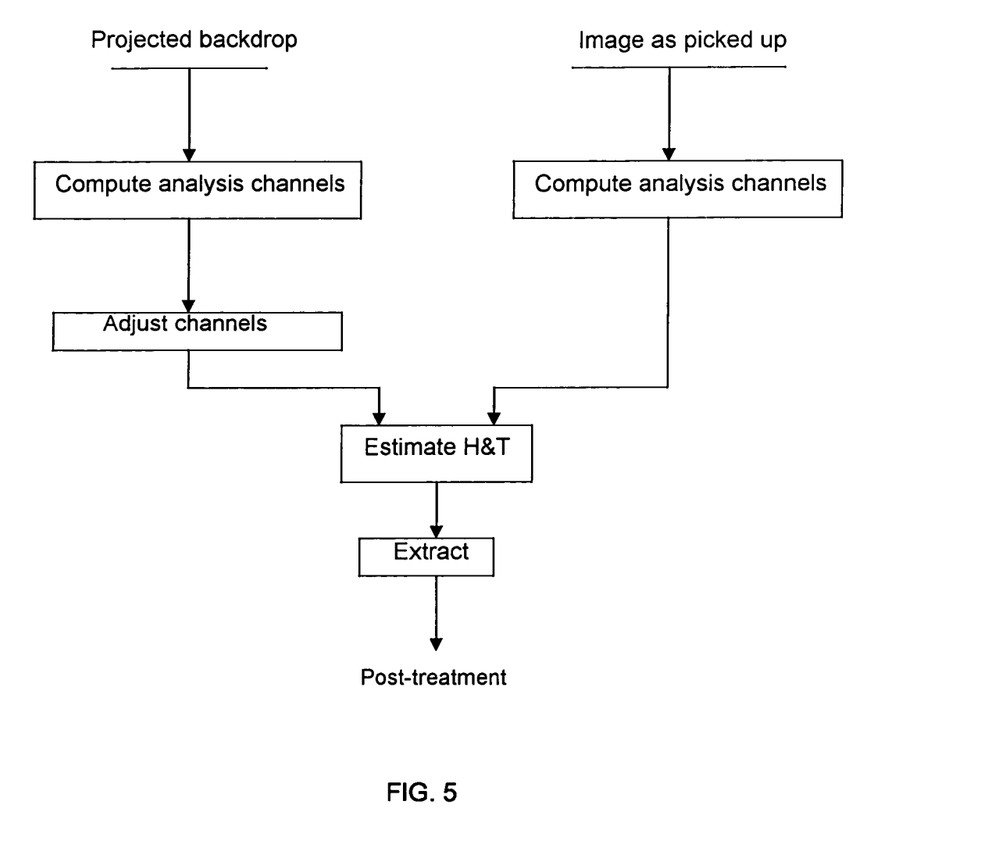
FIG. 5 is a diagram of the extraction step of the FIG. 3 method.

The extraction step proper is described below in detail with reference to FIG. 5.

This step begins by computing analysis channels from the video signals. These channels may be restricted to brightness alone, or they may correspond to three color channels (RGB, Lab, Lub, etc.) (G. Wyszecki and W. S. Stiles, Color science: concepts and methods, John Wiley and Sons, 1982), and also to local analyses such as averages, variances, Gabor filters, etc.

Then, a channel readjustment step is performed. Estimating the transfer function T on each of the channels requires sufficient data to be available. Typically, this means that it is necessary for each channel to know the range $[I_{min}, I_{max}]$ where $I_{min}$ and $I_{max}$ are the minimum and maximum values observed for I in the channel in question. Beyond those values, it is not possible to estimate a transfer function since no data is available. Rather than modifying the starting set of the transfer function as a function of the original image, it is preferable to impose a transformation from [0, 255] to $[E_{min}, E_{max}]$ where $E_{min}$ and $E_{max}$ are the minimum and maximum values observed in E, performing linear resampling of I over this dynamic range.

Another possibility would be to identify the positions of missing data in order to adapt the parameters for estimation, referred to below as $\alpha_{k'}$ in order to determine the transfer function T.

The following step consists in estimating the functions H and T.

The geometrical transformation function H can be represented in the general case of a plane projection surface by a homography that is defined by eight parameters written, a, b, c, d, e, f, g, and h, using the following conventional definition:

$$\begin{vmatrix} X \\ Y \end{vmatrix} = \begin{vmatrix} (ax+by+c)/(gx+hy+1) \\ (dx+ev+f)/(gx+hy+1) \end{vmatrix}$$

where x and y designate the coordinates of pixel s in the grid S of the backdrop image and Y and Y are the pixel coordinates as transformed by H.

When the axis of the camera is perpendicular to the projection surface, the geometrical transformation H can be defined by six parameters a, b, c, d, e, and f using the following definition:

$$\begin{vmatrix} X \\ Y \end{vmatrix} = \begin{vmatrix} ax + by + c \\ dx + ey + f \end{vmatrix}$$

The transfer function T is modeled by decomposition on the basis of generator functions that can equally well be wavelets (S. Mallat, "A wavelet tour of signal processing", Academic Press, 2nd Edition, 1999) or splines (B. Chalmond, "Modeling and inverse problems in image analysis", Applied Mathematics, Springer Verlag, Vol. 155, Chap. 3, pp. 53-57, 2003). For example, an implementation based on second order spline decomposition (continuity $C^{(1)}$) leads to the following expression:

$$T(x) = \Sigma_{k=1,\ldots,q} \alpha_k \cdot \beta(x-kp)$$

where $\alpha_k$ are the q spline decomposition parameters, p is the spline pitch, and $\beta(x)$ is the spline function defined by:

$$\beta(t) = \Sigma_{j=0,\ldots,3}(jp-t)_+^2/\Pi^3{}_{I=0,I\neq j}(j-Ip)$$

where the function $()_+$ represents the Heaviside function.

When T is defined on 256 gray levels, p is selected as a power of 2, and q satisfies the constraint q=(256/p)+2. If an implementation is used with p=32, then q=10.

The function F(H,T) measuring the cumulative error between the projected backdrop image I and the version E as picked up is defined by the M-estimator model (see article by P. J. Huber), namely:

$$F(H, T) = \sum_{s \in S} \rho(T(I(s)) - E(Hs))$$

$$= \sum_{s \in S} \rho\left(\sum_{k=1}^{q} \alpha_k \cdot \beta(I(s) - kp) - E(Hs)\right)$$

where $\rho(.)$ is a non-negative function here taken to be equal to the Tukey function (see article by P. J. Huber). Naturally, other functions could be used, such as the Huber function.

At this stage three estimation options are available:

1. Estimating the Function T Alone

This version is the simplest to implement since then F(H,T) is linear in $\alpha_k$. It also corresponds to the most frequent situation in which the mechanical arrangement is sufficiently rigid to limit any camera shake effects.

The algorithm that is then applied is the algorithm known as the iteratively reweighted least squares (IRLS) algorithm.

2. Estimating the Function H Alone

This does not offer linearity relative to the geometrical transformation parameters (homography or affinity). The principle of minimization (and estimation) then consists in first order linearization of the expression E(Hs) relative to the geometrical transformation parameters by writing the following:

$$E((H+dh)s) = E(Hs) + \Sigma_{I=1,\ldots,r}(\partial E/\partial X \cdot \partial X/\partial h_I + \partial E/\partial Y \cdot \partial Y/\partial h_I)dh_I$$

where $h_i$ represents the $I^{th}$ parameter of H and r the number of parameters in H.

The function to be minimized, with fixed H, then becomes:

$$F^o(dh,T) = \Sigma_{s \in S}\rho(\Sigma^q{}_{k=1}\alpha_k \cdot \beta(I(s)-kp) - E(Hs)) + \Sigma_{I=1,\ldots,r}(\partial E/\partial X \cdot \partial X/\partial h_I + \partial E/\partial Y \cdot \partial Y/\partial h_I)dh_I$$

The following notation is used $\theta = (dh_I)_{I=1,\ldots,r}$.

The principle of the algorithm used is described in J. M. Odobez, P. Bouthemy, "Robust multiresolution estimation of parametric models", Journal of Visual Communication and Image Representation, Vol. 6, No. 4, 1995:

in step t, the estimate of H is written $H_t$:
minimize $F^oH_t$ in $\theta$ for fixed $H_t$: linear in $\theta$, the function $F^oH_t$ enables minimization using the IRLS algorithm;
on convergence of the IRLS algorithm, update $H_{t+1}$ using $H_{t+1} = H_t + \theta$;
move on to step t+1;
continue iteration until the stop criterion is reached.

A stop criterion that can be used is as follows: iterate so long as the ratio $(F^oH_{t+1} - F^oH_t)/F^oH_t$ is greater than a threshold.

3. Combined Estimation of the Functions H and T

Combined estimation of H and T is performed as follows, using the notations given above:

in step t, the estimate for H is written $H_t$;
minimize $F^oH_t$ in $\theta$ and $\alpha$, for fixed $H_t$: linear in $\theta$ and $\alpha$, the function $F^oH_t$ enables IRLS minimization:
on convergence of the IRLS algorithm, update $H_{t+1}$ as follows $H_{t+1} = H_t + \theta$, $\alpha$ conserving its current value;
move on to step t+1;
continue iteration until the stop criterion is reached.

A stop criterion that can be used is as follows: iterate so long as the ratio $(F^oH_{t+1} - F^oH_t)/F^oH_t$ is greater than a threshold.

Extraction proper makes use of M estimators, having the interesting property of providing a measure, known as a weight, of the match between observation and the corresponding relationship. This measurement is normalized over the range 0 to 1, is defined at each image element s, and is given by $\omega_s = \rho'(\epsilon_s)/\epsilon_s$, where $\rho'$ is the derivative of $\rho$ (here the Tukey function) and $\epsilon_s = T(I(s)) - E(Hs)$. This weight takes the value close to zero when the error $\epsilon_s$ is large, as occurs when the image element does not match the corresponding relationship. In practical terms, it can be considered for example that the image element is a foreground image element if the weight $\omega_s$ as estimated for at least one of the channels i in use is less than 0.25.

Extracting and estimating the parameters T or H needs to be performed on each image, i.e. faster than 25 Hz. In the general case, the changes from one image to the next are very small or even non-existent. On each step, the values for the parameters of H and T are therefore very close to optimum values. It is then possible to envisage using a single iteration of IRLS algorithm in order to update H and T, thus enabling the module 40 to operate in real time using microprocessors of the kind presently available on the market. It is thus possible to track changes in daylight, which takes place generally quite slowly, and small amounts of camera shake in the projection and pickup configuration, if it is not completely rigid. In the event of sudden changes, as when switching on electric lights, a delay effect might be observed in the adaptation of the algorithm. The number of IRLS iterations per image could then be increased in order to reduce this drawback, within the limits imposed by refreshing at 25 Hz.

Another possibility would be to perform one iteration per image; given the small number of iterations, the time required to update an estimate would not be more than about one second.

Finally, a last step, referred to as post-treatment, can be performed in order to regularize the binary segmentation. The purpose is to eliminate from the image delivered by the module 40 any backdrop pixels that are present in the extracted objects, and conversely any backdrop pixels identified as needing to be extracted. One possible method consists in making use in succession of a morphological erosion filter followed by an expansion filter (C. R. Giardina and E. R.

Dougherty, Morphological methods in image and signal processing, Englewood Cliffs, N.J.: Prentice-Hall, 321, 1988). For under-resolved images (194×120), the erosion and expansion radius used is 2.

In order to estimate the geometrical transformation function H and the light transfer function T, it is preferable to have a prior estimate that is close to the required solution. This is the purpose of the initialization step shown in FIG. 4, which step is performed on the backdrop as projected and picked up by the camera 20.

Figure 4:
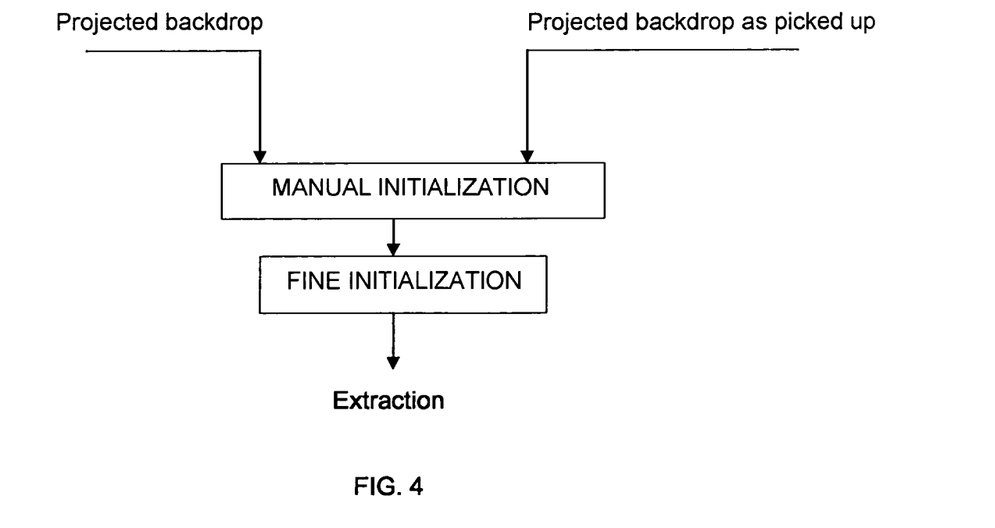
FIG. 4 is a diagram of the initialization step of the FIG. 3 method.

For this purpose, a search is made initially for an approximate value for the geometrical transformation H.

A coarse estimate of H is performed manually by pointing out four particular points of the projected image as seen in the image as picked up: these may be the four corners for example if the image as picked up contains the entire projected image, or otherwise these may be other points. The matches between the four points in the projected image and their projections on the image as picked up provide eight linear equations making it possible to identify the six or eight parameters of the geometrical transformation either by direct linear system inversion with homography, or by least squares minimization with affinity.

The transfer function T or the transfer functions $T_i$ are initialized using the identity function.

It is then possible to refine the estimates of H and T. This estimation is performed in a manner analogous to the estimation described above with reference to FIG. 5. Nevertheless, this step can be performed without any real-time constraint. Since the initial source estimate is quite far from the solution, particularly concerning the transfer function T, the number of iterations might be high. Nevertheless, in order to optimize computation time, a multi-resolution scheme using three resolutions levels is implemented (see article by J. M. Odobez).

The invention claimed is:

1. A method of extracting from a picked-up image an object that is situated in the foreground of a projected backdrop, the projected backdrop being formed by the projection of a known backdrop image I(s), s representing a pixel, wherein the method includes an extraction step comprising the steps of:
    establishing a correspondence relationship between pixels of the known backdrop image I(s) and of the background of the image as picked up, said correspondence relationship being described by a geometrical transformation function H and by a light transfer function T, said geometrical transformation function H having an initial value previously estimated by putting particular pixels into correspondence between the known backdrop image I(s) and the image as picked up;
    defining said object as the set of picked-up pixels that present a departure from said correspondence relationship; and
    iteratively updating at least the geometrical transformation function H to establish an updated correspondence relationship between the pixels of the known backdrop image I(s) and of the background of the image as picked up,
    wherein the geometrical transformation function H and the light transfer function T are mathematically estimated by iteratively evaluating a function which includes the geometrical transformation function H, the light transfer function T, the known backdrop image I(s), and the image E as picked up, starting with the light transfer function T having a determined initial value and the geometrical transformation function H having the initial value previously estimated.

2. The method according to claim 1, wherein said correspondence relationship is described by said geometrical transformation function H and said light transfer function T as follows:

$$T(I(s))=E(Hs)$$

expressing equality between the brightness T(I(s)) at pixel s in the known backdrop image I(s), corrected by the light transfer function T, and the brightness E(Hs) observed at pixel Hs in the image E as picked up, where the pixel Hs is the image of the pixel s after transformation by the geometrical transformation function H.

3. The method according to claim 2, wherein said departure from the correspondence relationship is represented by an observed noise level $\epsilon_s$ at each pixel s:

$$\epsilon_s = T(I(s)) - E(Hs).$$

4. The method according to claim 1, further comprising estimating the geometrical transformation function H and the light transfer function T by minimizing the function F(H,T):

$$F(H,T)=\Sigma_s \rho(T(I(s))-E(Hs)$$

expressing the accumulated error over the set of pixels s between the brightness T(I(s)) at pixel s of the known backdrop image I(s), corrected by a light transfer function T, and the brightness E(Hs) at pixel Hs of the image E as picked up, where pixel Hs is the image of the pixel s as transformed by the geometrical transformation function H, and where ρ is an error cost function.

5. The method according to claim 1, wherein said method includes an initialization step comprising:
    estimating the geometrical transformation function H from the correspondence between particular pixels of the known backdrop image I(s) and of the image as picked up; and
    initializing the light transfer function T with an identity function.

6. The method according to claim 1, wherein said method includes a post-treatment step comprising regularizing the extracted object.

7. The method according to claim 1, wherein the extraction step includes a prior step of adjusting the light intensity channels of the backdrop.

8. The method according to claim 1, wherein the iterative updating of at least the geometrical transformation function H is performed at least once per picked-up image.

9. The method according to claim 1, wherein the iterative updating of at least the geometrical transformation function H is performed at a frequency greater than 25 Hz.

10. The method according to claim 1, further comprising iteratively updating the light transfer function T.

11. The method according to claim 1, wherein the geometrical transformation function H and the light transfer function T are mathematically estimated by iteratively minimizing a function F(H,T) expressing the accumulated error over the set of pixels s between the brightness T(I(s)) at pixel s of the known backdrop image I(s), corrected by the light transfer function T, and the brightness E(Hs) at pixel Hs of the image E as picked up, where pixel Hs is the image of the pixel s as transformed by the geometrical transformation function H.

12. A non-transitory computer-readable medium storing a computer program including program code instructions for implementing the steps of the method according to claim 1, when said program is executed on a computer.

13. A method of transmitting an image for reproducing on a remote station an image comprising an object situated in the foreground of a projected backdrop, the method implementing an object extraction method according to claim 1, followed by a step of transmitting the object to the remote station.

14. A method of forming an image on a remote station from an object transmitted by the method according to claim 13, the image formation method including a step of superposing the object on the backdrop made available on said remote station.

15. A module, comprising a microprocessor configured to control the following means for operations, for extracting from an image as picked up an object situated in the foreground of a projected backdrop, the projected backdrop being formed by the projection of a known backdrop image I(s), s representing a pixel, wherein the module comprises:

means for establishing a correspondence relationship between pixels of the known backdrop image I(s) and of the background of the image as picked up, said correspondence relationship being described by a geometrical transformation function H and by a light transfer function T, said geometrical transformation function H having an initial value previously estimated by putting particular pixels into correspondence between the known backdrop image I(s) and the image as picked up;

means for defining said object as the set of picked-up pixels that present a departure from said correspondence relationship; and means for iteratively updating at least the geometrical transformation function H to establish an updated correspondence relationship between the pixels of the known backdrop image I(s) and of the background of the image as picked up, wherein the geometrical transformation function H and the light transfer function T are mathematically estimated by iteratively evaluating a function which includes the geometrical transformation function H, the light transfer function T, the known backdrop image I(s), and the image E as picked up, starting with the light transfer function T having a determined initial value and the geometrical transformation function H having the initial value previously estimated.

16. The module according to claim 15, wherein said module includes means for computing said geometrical transformation function H and said light transfer function T by minimizing the function F(H,T):

$$F(H,T)=\Sigma_s \rho(T(I(s))-E(Hs)$$

expressing the accumulated error over the set of pixels s between the brightness $T(I(s))$ at pixel s of the known backdrop image I(s), corrected by a light transfer function T, and the brightness $E(Hs)$ at pixel Hs of the image E as picked up, where pixel Hs is the image of the pixel s as transformed by the geometrical transformation function H, and where $\rho$ is an error cost function.

17. The module according to claim 15 wherein said module includes post-treatment means suitable for regularizing the extracted object.

18. The module according to claim 15 wherein, said module includes channel adjustment means for adjusting the channels derived from the brightness I of the backdrop.

19. The module according to claim 15, wherein the geometrical transformation function H and the light transfer function T are mathematically estimated by iteratively minimizing a function F(H,T) expressing the accumulated error over the set of pixels s between the brightness $T(I(s))$ at pixel s of the known backdrop image I(s), corrected by the light transfer function T, and the brightness $E(Hs)$ at pixel Hs of the image E as picked up, where pixel Hs is the image of the pixel s as transformed by the geometrical transformation function H.

* * * * *